United States Patent
Robinson

(10) Patent No.: US 7,995,556 B2
(45) Date of Patent: Aug. 9, 2011

(54) GATEWAY FOR USING NON-IP DIGITAL PBX TELEPHONE HANDSETS WITH AN IP CALL CONTROLLER

(75) Inventor: Michael J. Robinson, Seattle, WA (US)

(73) Assignee: Tortel USA LLC, Amherst, NY (US)

( * ) Notice: Subject to any disclaimer, the term of this patent is extended or adjusted under 35 U.S.C. 154(b) by 1200 days.

(21) Appl. No.: 10/608,053

(22) Filed: Jun. 27, 2003

(65) Prior Publication Data

US 2004/0066923 A1    Apr. 8, 2004

Related U.S. Application Data

(63) Continuation of application No. PCT/US01/50850, filed on Dec. 26, 2001.

(60) Provisional application No. 60/258,464, filed on Dec. 27, 2000.

(51) Int. Cl.
    *H04L 12/66* (2006.01)
(52) U.S. Cl. .......................... 370/352; 370/356
(58) Field of Classification Search .................. None
    See application file for complete search history.

(56) References Cited

U.S. PATENT DOCUMENTS

| | | | |
|---|---|---|---|
| 6,205,208 B1 * | 3/2001 | Detlefsen et al. | 379/93.05 |
| 6,275,574 B1 * | 8/2001 | Oran | 379/201.01 |
| 6,671,375 B1 * | 12/2003 | Fukuju et al. | 379/399.01 |
| 6,765,912 B1 * | 7/2004 | Vuong | 370/395.2 |
| 6,842,447 B1 * | 1/2005 | Cannon | 370/352 |
| 6,996,094 B2 * | 2/2006 | Cave et al. | 370/356 |
| 7,035,248 B2 * | 4/2006 | Wengrovitz | 370/352 |
| 7,072,056 B1 * | 7/2006 | Greaves et al. | 358/1.15 |

(Continued)

FOREIGN PATENT DOCUMENTS

CA    2433560 A1    7/2002

(Continued)

OTHER PUBLICATIONS

Korpi, Markku and Kumar, Vineet;Supplementary Services in the H.323 IP Telephone Network; IEEE Communications Magazine Jul. 1999; pp. 118-125.

(Continued)

*Primary Examiner* — Pankaj Kumar
*Assistant Examiner* — Marcus R Smith
(74) *Attorney, Agent, or Firm* — Paul F. Rusyn; Graybeal Jackson LLP

(57) ABSTRACT

A gateway 11 for using non-IP digital telephone handsets 10 with an IP call controller ("PBX") 12, 24, 42. The gateway may be implemented to work with any non-IP digital telephone handset and any IP call controller. The call controller may be a public protocol IP Centrex call controller 24 or a proprietary protocol call controller 12, 42. The gateway is programmable so that a single hardware unit can be programmed after it is plugged in to work with any such devices. The programming is accomplished via IP download from a server on the global IP network 23. The gateway may be implemented as a plug in card 40 for an IP call controller 42 that accepts plug in cards. Alternatively, it may be implemented to work with remote IP call controllers 12, 42. In this latter configuration, the gateway may include a router for other IP devices which is designed to give voice quality preference to the telephone handsets over other IP devices.

32 Claims, 7 Drawing Sheets

Handset Gateway Internal Design

U.S. PATENT DOCUMENTS

| | | | |
|---|---|---|---|
| 7,415,029 B1 * | 8/2008 | Hyams et al. | 370/401 |
| 2002/0159439 A1 * | 10/2002 | Marsh et al. | 370/352 |

FOREIGN PATENT DOCUMENTS

| | | |
|---|---|---|
| EP | 1360826 A2 | 11/2003 |
| WO | 9955049 A1 | 10/1999 |
| WO | WO 99/55049 | 10/1999 |
| WO | 0011818 A1 | 3/2000 |
| WO | WO 00/11818 | 3/2000 |
| WO | WO 00/77992 A1 | 12/2000 |
| WO | 02052827 A3 | 7/2002 |

OTHER PUBLICATIONS

Architecture for Voice, Video, and Integrated Data; Cisco Systems White Paper, Copyright 2000 Cisco Systems, Inc.

Extending the Enterprise PBX over Broadband Networks; MCK Communications, Inc.; http://www.mck.com/html/ni_rl_whitepaper_4.htm; published 1999.

EXTender PBXgateway; MCK Communications, Inc.; published 2000.

International Preliminary Report on Patentability Dated Sep. 15, 2004, for International Patent Application No. PCT/US2001/050850 Filed Dec. 26, 2001.

* cited by examiner

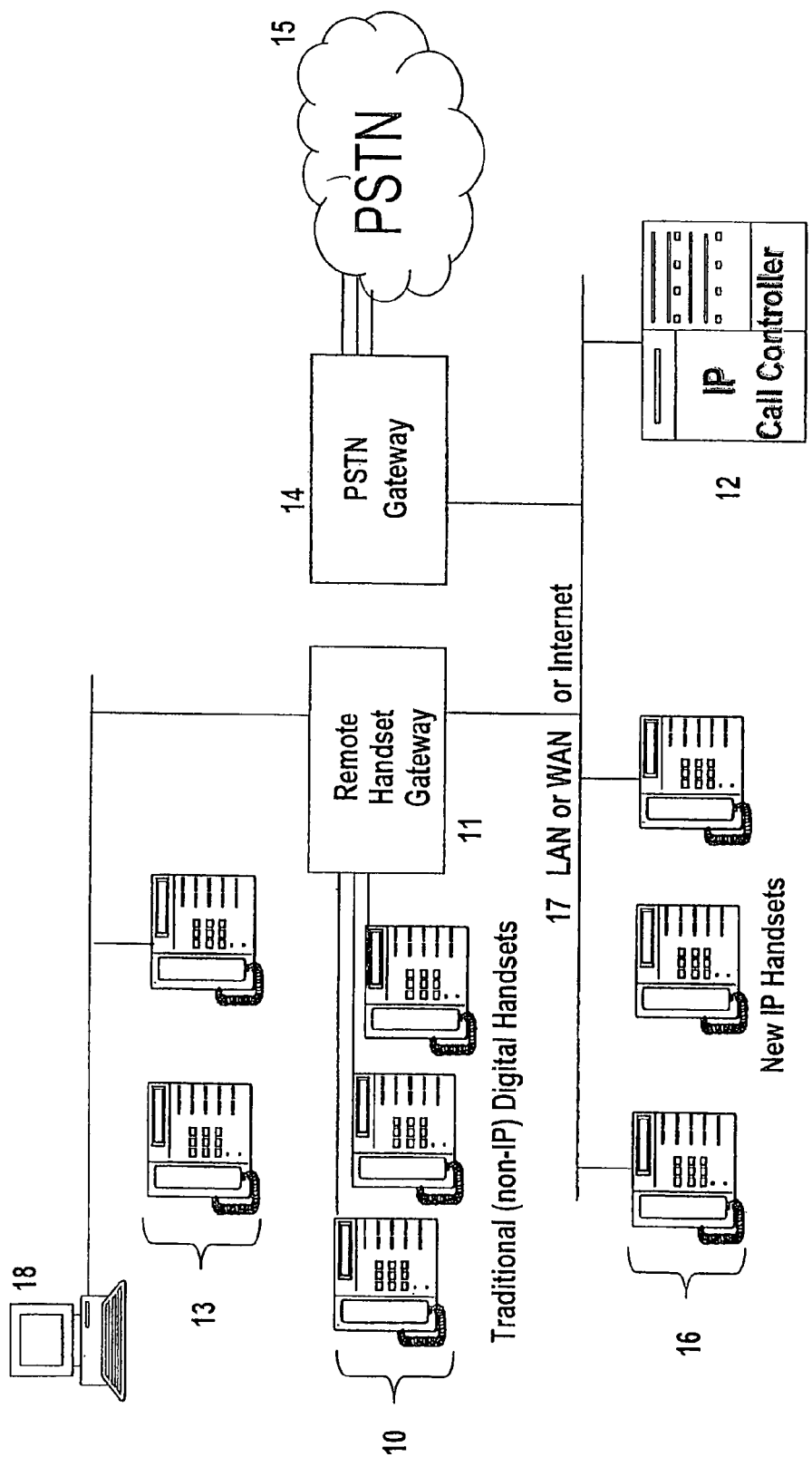
Figure 1A: Gateway for Digital Phones on LAN with IP PBX

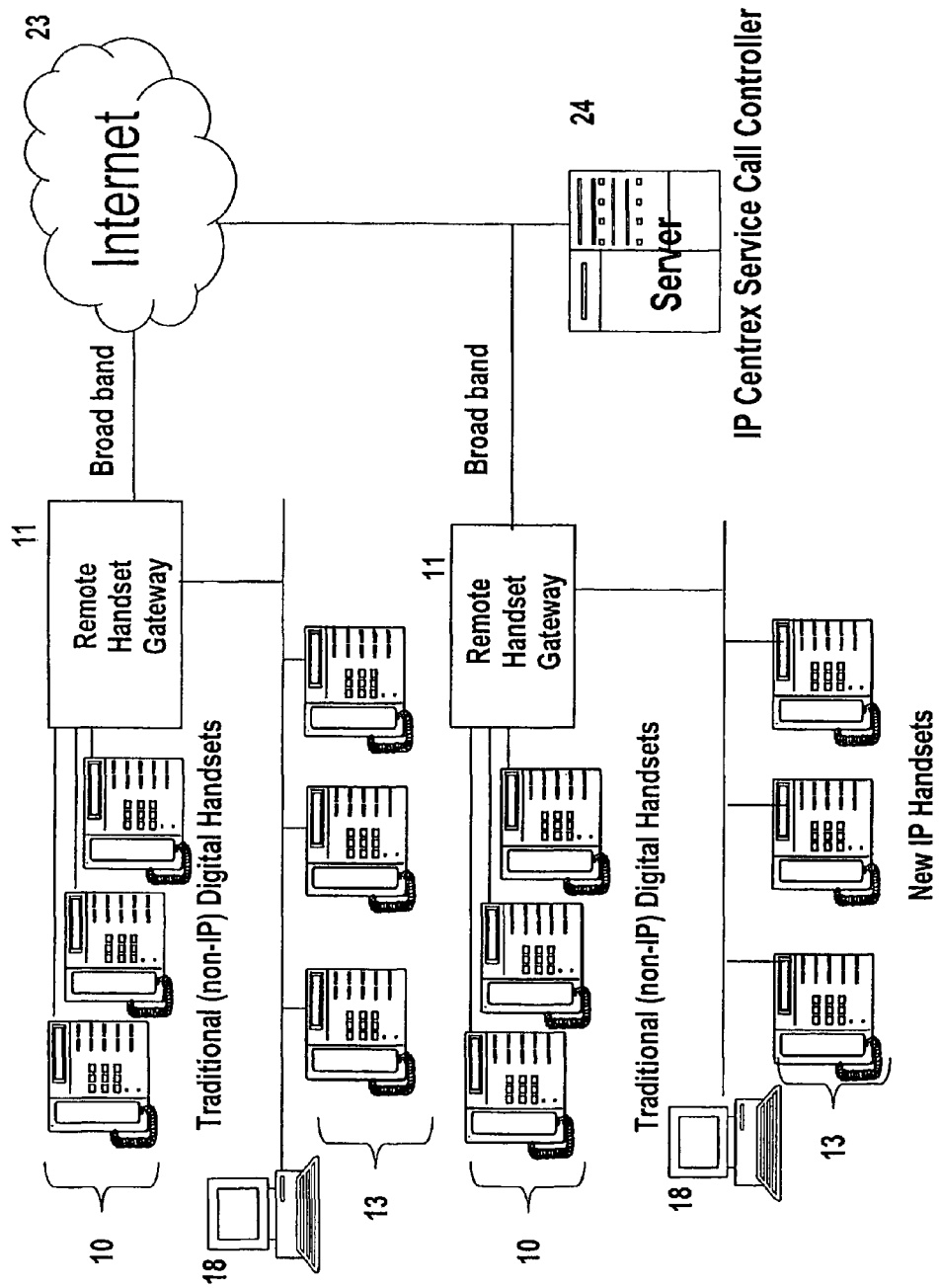
Figure 1B: Gateways with DSL Modems on IP Centrex Service

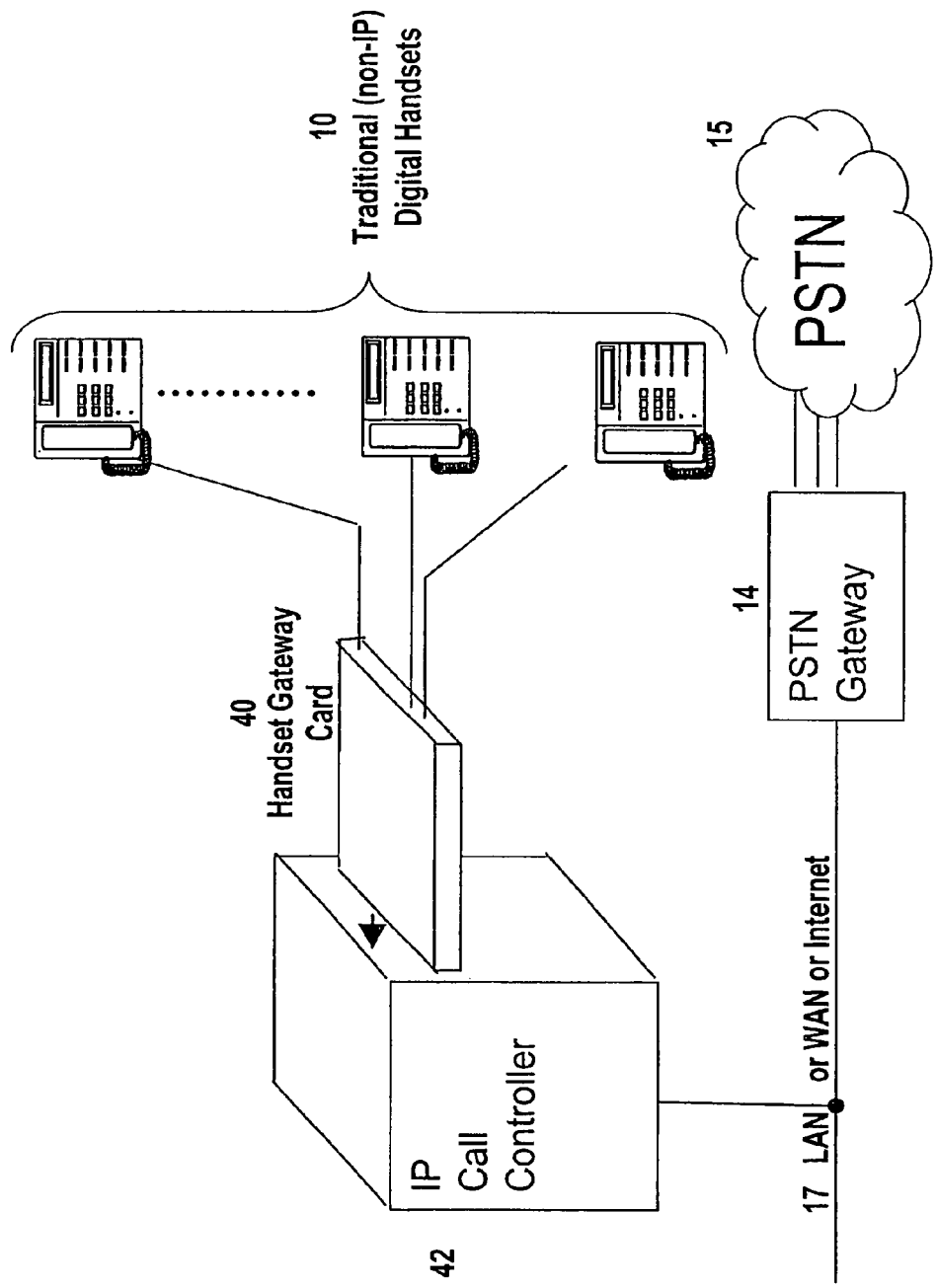
Figure 1C: Handset Gateway on a Plug-In Card

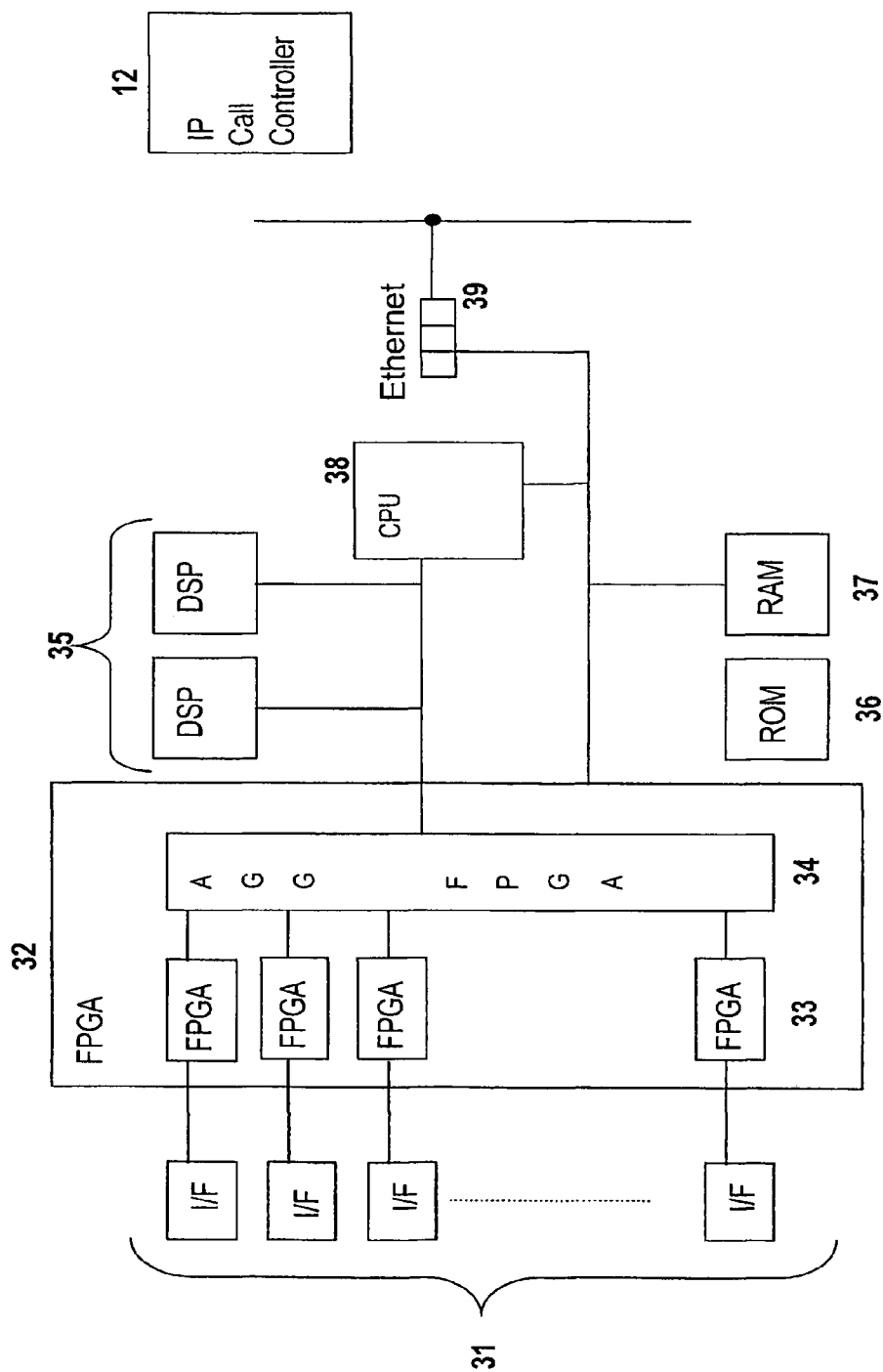
Figure 2: Handset Gateway Internal Design

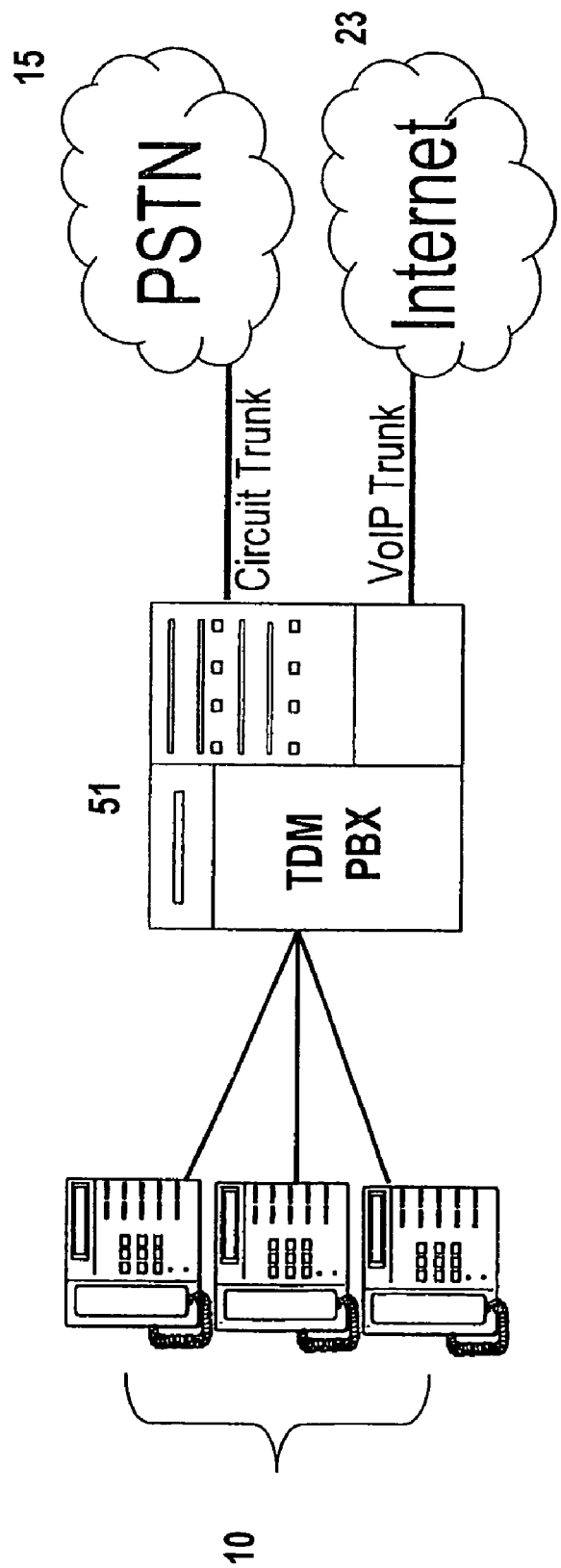
Figure 3: TDM PBX with VoIP trunk (Prior Art)

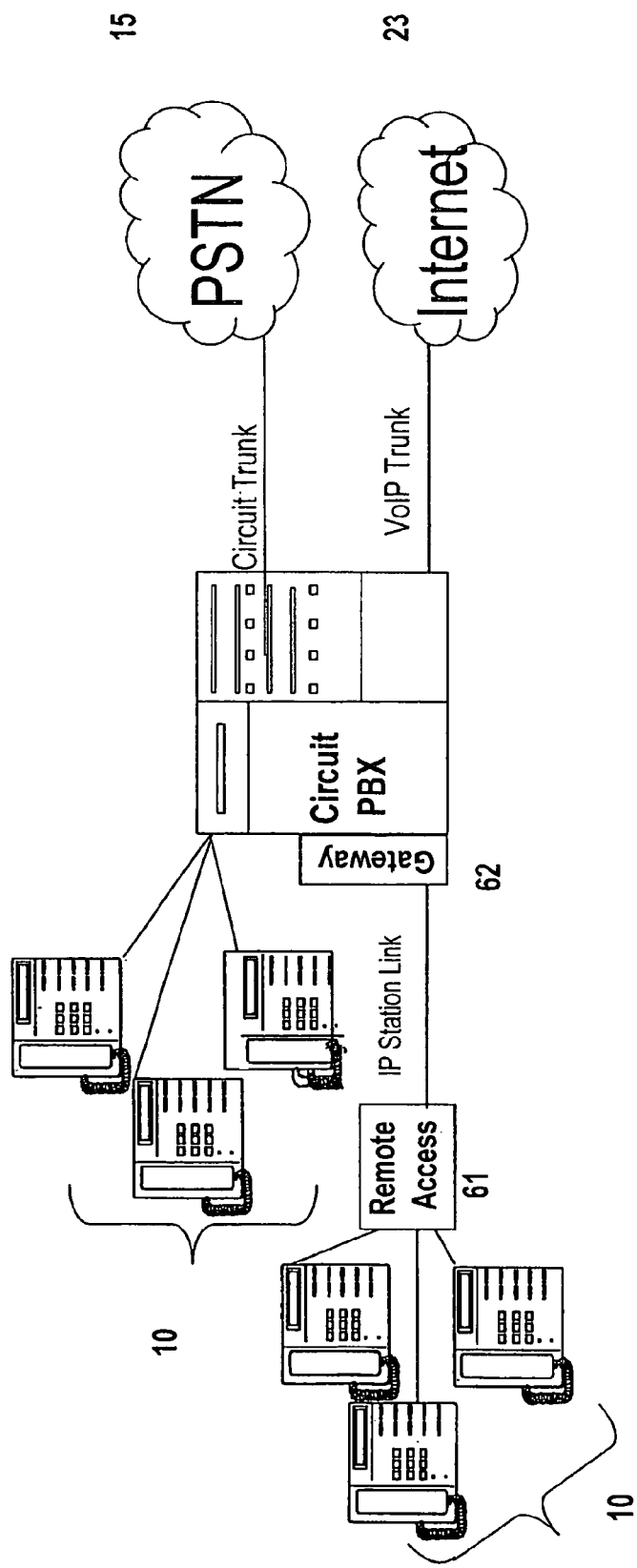
Figure 4: TDM PBX with VoIP Remote Access stations (Prior Art)

GATEWAY FOR USING NON-IP DIGITAL PBX TELEPHONE HANDSETS WITH AN IP CALL CONTROLLER

PRIORITY CLAIM

The present application is a Continuation of co-pending International Patent Application No. PCT/US2001/050850, filed Dec. 26, 2001, which application claims the benefit of U.S. Provisional Patent Application No. 60/258,464, filed Dec. 27, 2000, now expired; all of the foregoing applications are incorporated by reference herein in their entireties.

BACKGROUND

Early telephone systems had a separate circuit from the central office to each telephone and a switchboard with plugs and wires in the central office for a person to make connections. Automated switches replaced the plugs and wires operated by a human. Then some of the automated switching functions were moved upstream into private equipment in company offices to save the cost of requiring a separate line from each telephone to the central office. Because the central office was called an "exchange", the remote switch was called a "private branch exchange", or PBX. At first, the PBX merely performed switching functions. Then, as additional functions were invented for business telephones, such as hold, transfer, conference, indicator lights, and displays, what was merely a switch became what we refer to here as a "call controller". A KTS (Key Telephone System) is a simpler and less expensive form of such a call controller. Within this document, the term "call controller" is used to describe both such PBX and KTS devices as well as a newer form of call controller that uses packet switching on a packet switched network, preferably a network running Internet Protocol (IP), discussed further below. Although the new IP call controller is "private", it is not in any sense a "branch exchange", so the term IP-PBX, while it is commonly used, is misdescriptive.

The handsets that are used with a PBX or a KTS support many additional features that a standard analog telephone for use with the public network cannot support. Although there are differences in functionality between a PBX and a KTS, the handsets for use with either are essentially the same. When this document refers to a PBX telephone handset, it means a handset with additional features for use with a PBX or with a KTS that supports those features. Likewise, when this document refers to PBX equipment, unless the context requires otherwise, it means PBX or KTS equipment.

Standard PBX (or KTS) equipment for the last 30 years has used digital communications between the PBX and the telephone handset to exchange the various call control signals between the PBX call controller and the digital handset. Within the PBX, in order for a circuit to handle control signaling and many telephone call voice signals at once, time division multiplexing (TDM) was developed. In this method, each hundredth of a second is divided into many much smaller time slots and the time slots are allocated sequentially among many circuits. Each circuit receives a high enough percentage of each hundredth of a second of time to produce a voice quality connection for reception by a human.

Although digital signaling between each handset and the PBX with TDM multiplexing in the PBX has become universally adopted by all telephone equipment manufacturers, there are no standards. Consequently, the handset of one manufacturer will not operate with the PBX of another manufacturer. However, as publicly regulated monopolies, telephone companies began to offer similar call control functions from their central offices with digital call control signaling from call controllers running public signaling protocols called "Centrex" systems. Centrex systems and PBX systems all used "circuit switched" networks where a single circuit, although it may be time division multiplexed, is established between each pair of telephones in communication with each other and those telephones use 100 percent of that circuit, even when neither party is talking.

Economies of scale can be accomplished if the voice communications are merged with data communications, and further economies are achieved if the communications are sent via packet switched networks rather than circuit switched networks. A packet switched network can merge packets from many different origins destined for many different destinations into a single "channel" and then separately switch them to different directions at a subsequent point in their journey, as opposed to a circuit switched PBX (or KTS) which switches calls through the creation of physical electronic circuits and uses time division multiplexing (TDM) on a local area bus.

Attempts to merge voice communications and data communications over packet switched networks did not achieve market acceptance until implementation of the global computer network based on Internet Protocol (IP). IP telephony is revolutionizing the telecom industry with promises of the following benefits (among others):

1. Eliminating distance sensitivity in pricing and telecom features. A call from London to Seattle can cost the same and provide the same features as a call between two offices on the same floor.
2. Easing the development and deployment of intelligent features such as computer-telephone integration, "reach me" and "personal assistant" services, and unified messaging.
3. Reducing the cost of telephone systems by leveraging the economies of scale that come from putting voice and data traffic on a single data network rather than two disparate and separately maintained networks (one for voice, one for data).

These benefits of IP telephony are typically delivered through a proprietary IP call controller (often misdescriptively called an "IP-PBX"—Private Branch Exchange—by analogy to a traditional PBX) using packet switching on a data network. Some of the same benefits can also be provided by a public IP call controller, an IP Centrex system.

To obtain some of the benefits of using the global IP network for telephone communications, as shown in FIG. 3, PBX manufacturers have been adding an internet protocol interface on the trunk side of the PBX 51 so that, in addition to sending out calls over the public switched telephone network (PSTN) 15, they can also send calls via Voice over IP (VoIP) on the Internet 23. However, further benefits can be achieved by communicating between the handsets and the call controller via IP on a data network using IP handsets and IP call controllers (IP-PBXs).

Most existing circuit switched PBXs (and KTSs) support desktop telephone handsets which use a variety of proprietary digital signaling methods to deliver enhanced features such as an LCD call status display, multiple line appearances, various indicator lamps, and intelligent "feature buttons". Contemporary IP PBX systems do not support these handsets but instead support proprietary IP digital telephone handsets. The IP digital telephone handsets connect directly to an IP network and therefore require fairly intelligent IP circuitry in the handset, which makes them rather expensive compared to the digital telephones employed by a typical circuit PBX. Most IP PBX's also support the attachment of standard analog telephones via various gateway devices. This reduces the cost of the handsets, but analog telephones do not support the advanced features which a typical business user expects—such as LCD display and indicator lights. So the trade-off for users of IP telephony is: a) pay more for IP phones with lots of features, or b) settle for less expensive analog phones with gateways but fewer features.

A hybrid has been developed that allows companies to use their existing handsets and traditional PBX equipment but carry the communications between the two across an IP network so that the handsets and PBX can be located remotely from each other while using the IP network to achieve a highly effective low cost connection. As shown in FIG. 4, this system requires a gateway 62 that places the PBX signals into packets and provides IP headers for those packets so they can be transmitted on an IP network. Similarly, the handsets 10 are coupled to a remote access interface 61 that receives packets from the PBX, extracts the voice data and feature signaling data from each packet, and forwards the resulting PBX type data to the appropriate handset. Likewise, it receives signaling data from each handset and encapsulates the data into IP packets, adds a header to each packet, and sends them on the network to the gateway where the data is decapsulated.

When voice communications (or other real time communications) are sent over an IP network, the packets must be given precedence over packets that are not sensitive to real time delivery, such as computer data packets, to avoid problems of perceptible time delays and "jitter" which is a disruption in voice quality resulting from otherwise imperceptible time delays. Therefore, voice communications are routed over IP network connections where such precedence can be managed over each link in the network.

SUMMARY

This document discloses a gateway device 11 that enables a cluster of less-expensive but feature-rich "traditional" digital non-IP PBX telephones to operate with a new IP call controller (IP PBX). These gateway devices can also be made to support the existing installed base of proprietary digital telephones such that a current PBX owner can retain their desktop telephones while installing a new IP PBX or connecting to a carrier's IP Centrex service. This represents a unique new architecture for IP telephony in that traditional digital business telephones are connected to a purely packet-switched telephony network through a cluster controller or "Handset Gateway" as shown in FIG. 1A.

While FIG. 1A shows a Handset Gateway connected to a LAN (Local Area network), the Handset Gateway can also be combined with a DSL (Digital Subscriber Line) modem or other broadband connection to an IP network to create a unique IAD (Integrated Access Device) supporting traditional digital business telephones on an IP Centrex service, as shown in FIG. 1B.

It is important to note that in both cases, the traditional non-packet-switched digital business telephones are connected directly to a wholly packet switched voice communications service. This differs from the prior art which involves using IP packet links as transport links in a circuit-switched voice communications network.

In one aspect, the invention is a gateway for using non-IP digital, PBX telephone handsets with an IP call controller. The gateway has one or more ports for coupling non-IP digital PBX telephone handsets to the gateway. It also has an IP port for coupling to an IP network device for communicating in Internet Protocol on an IP network. Inside the gateway device is a translator circuit that translates non-IP digital PBX telephone call control signals received at a handset port into IP telephone call control signals for an IP telephone call controller and delivers them to the IP port. The same circuit or a parallel circuit also translates IP telephone call control signals received at the IP port from an IP telephone call controller into non-IP digital PBX telephone call control signals and delivers them to the one or more handset ports.

The gateway may be designed and built to work only with one particular IP call controller protocol and one particular non-IP digital PBX telephone handset protocol. However, in the preferred embodiments, it is programmable so that it can be programmed to work with any of many different IP call controllers and any of many different non-IP digital PBX telephone handsets. Such programming may be done by coupling to the gateway a wire connected to a user interface device, such as a personal computer with a keyboard and monitor. The preferred method of programming is with IP communications through the IP port. The IP communications may come from a general-purpose computer operated by a human with a keyboard and monitor or it may come from any other computer on the IP network that downloads to the gateway a set of data parameters or program instructions that cause the gateway to work with a selected IP telephone call controller and a selected set of non-IP digital PBX telephone handsets. The download of such parameters or instructions may happen automatically once an IP session is established between the gateway and an IP service.

Using the configuration circuits just described, the invention is also a method in a telephone IP gateway for programming the gateway to work with a particular IP telephone call controller. In this method, the gateway receives at an IP port a signal from an IP telephone call controller and, based on the signal, sends to a remote IP server via the IP port information identifying the call controller. Then, the gateway receives from the server programming information, such as data parameters or program instructions, which cause the gateway to work with the IP telephone call controller. The information identifying the call controller that is sent to the remote IP server may be the actual signal received from the call controller. Alternatively, the gateway may use a processor to analyze the signal, retrieve from a memory information identifying the call controller, and send that information to the remote IP server.

Analogously, the invention is also a method in a telephone IP gateway for programming the gateway to work with non-IP digital PBX telephone handsets. In this method, the gateway receives at a port for non-IP digital handsets a signal from a connected handset and, based on the signal, sends to a remote IP server via an IP port in the gateway information identifying the handset. Then, the gateway receives from the server programming information for the gateway to cause the gateway to work with the handset. As described above, the method can be performed by passing to the server the actual signals received from the handset or by processing the signals in a processor to retrieve information identifying the handset from a memory in the gateway and forwarding that information to the server.

In another aspect, the invention is a method in such a gateway with enough "intelligence" to manage call control functions with the non-IP digital PBX handset which functions do not actually require a response from the IP call controller. For example, if a user of the handset wishes to put a call on hold, the gateway can send the appropriate signals to the handset to light a hold indicator and can cease passing voice signals to and from the handset for the call that has been placed on hold.

In a related aspect, the invention is a method for the gateway to implement a call control function by receiving from a non-IP digital telephone handset coupled to the gateway a command to perform a call control function and, in response, sending a call control signal to a second non-IP digital telephone handset coupled to the gateway. For example, the function may be the establishment of a voice connection between the first handset and a second handset with no communication sent via the IP port. Alternatively, the function may be the establishment of a telephone conference between a first handset and a second handset and one or more IP voice streams entering the gateway from the IP network.

In another aspect, the invention is a gateway for non-IP digital PBX telephone handsets that assigns an address for IP communications to each handset port to which a non-IP digital PBX telephone is coupled and registers each address for IP communications with the IP telephone call controller. This allows each telephone handset to be viewed by the controller as a separate device. The gateway itself becomes transparent to the call controller.

While this transparency is preferred for enabling maximum functionality of each handset, there are other system management functions in which the IP telephone, call controller communicates directly with the gateway, such as gateway registration and system status reporting. In this aspect, the invention is a gateway that includes a registration circuit the registers the gateway with the IP telephone call controller for such system management.

In another aspect, the invention is a gateway for coupling non-IP telephone handsets to an IP network that also includes sub-ports for coupling other IP devices to the IP network. In this aspect, the gateway includes a general purpose IP router for coupling one or more additional devices to the IP network in addition the handsets. In order for the handsets to operate with sufficient voice quality communications, the IP packets going to and from the handset are given voice quality precedence over packets received at the one or more IP sub-ports.

In another aspect, the above-described gateway may be built as a plug-in card for an IP call controller as shown in FIG. 1C. Although this prevents the IP call controller from being located remotely from the gateway as shown in FIGS. 1A and 1B, it presents economic advantages by allowing the gateway to be made at lower cost with lower cost connections between the gateway and the IP call controller.

In another aspect, the invention is a system wherein non-IP digital PBX telephone handsets are coupled to an IP telephone call controller in a public telephone network. The system includes an IP telephone call controller operating a public telephone network according to public IP call control protocols and coupled to the global IP network. There is also a gateway coupled to the global IP network at a location remote from the IP telephone call controller with one or more non-IP digital PBX telephone handsets coupled to the gateway via wires for carrying non-IP digital PBX telephone call control signaling between the handset and the gateway. As described above, the gateway has one or more protocol translating circuits that translate non-IP digital PBX call control signals received from a handset into IP call control signals according to the public IP call control protocols of the call controller. The same circuit or a parallel circuit also translates IP call control signals from the call controller into non-IP digital PBX call control signals for a handset coupled to the gateway. In this embodiment, the gateway preferably includes a general purpose IP router coupled to the IP port in the gateway and to one or more IP sub-ports in the gateway, and the router gives voice quality preference to IP packets going to or from the one or more telephone handsets over IP packets going to or from devices coupled to the IP sub-ports.

In another aspect, the invention is a system where one or more non-IP digital PBX telephone handsets are coupled to a proprietary IP telephone call controller in a private telephone network. In this aspect, the invention comprises a proprietary IP telephone call controller operating according to proprietary IP call control protocols coupled to the global IP network. Also coupled to the IP network is a gateway in a location remote from the call controller with one or more non-IP digital PBX telephone handsets coupled to the gateway via wires for carrying non-IP digital PBX telephone call control signaling between the handset and the gateway. As described above, the gateway has one or more protocol translating circuits that translate non-IP digital call control signals received from a handset into IP call control signals according to proprietary IP call control protocols of the call controller. In addition, the same circuit or a parallel circuit translates proprietary IP call control signals from the call controller into non-IP digital call control signals for a handset coupled to the gateway. As described above, the gateway may include a general purpose IP router which gives voice quality preference to IP packets going to or from the one or more telephone handsets over IP packets going to or from other devices coupled to IP sub-ports in the gateway.

BRIEF DESCRIPTION OF THE DRAWINGS

FIG. 1A shows the system configuration for use with a proprietary IP call controller.

FIG. 1B shows the system configuration for use with a public Centrex IP call controller.

FIG. 1C shows the system configuration where the gateway is a plug-in card in a proprietary call controller.

FIG. 2 is a block diagram of the internal design of the handset gateway.

FIG. 3 shows prior art, a proprietary PBX with a VoIP trunk.

FIG. 4 shows prior art, a PBX connected to its matched handsets with an IP link where the PBX signaling is encapsulated in IP packets and then decapsulated upon receipt.

DETAILED DESCRIPTION

Figure 5:
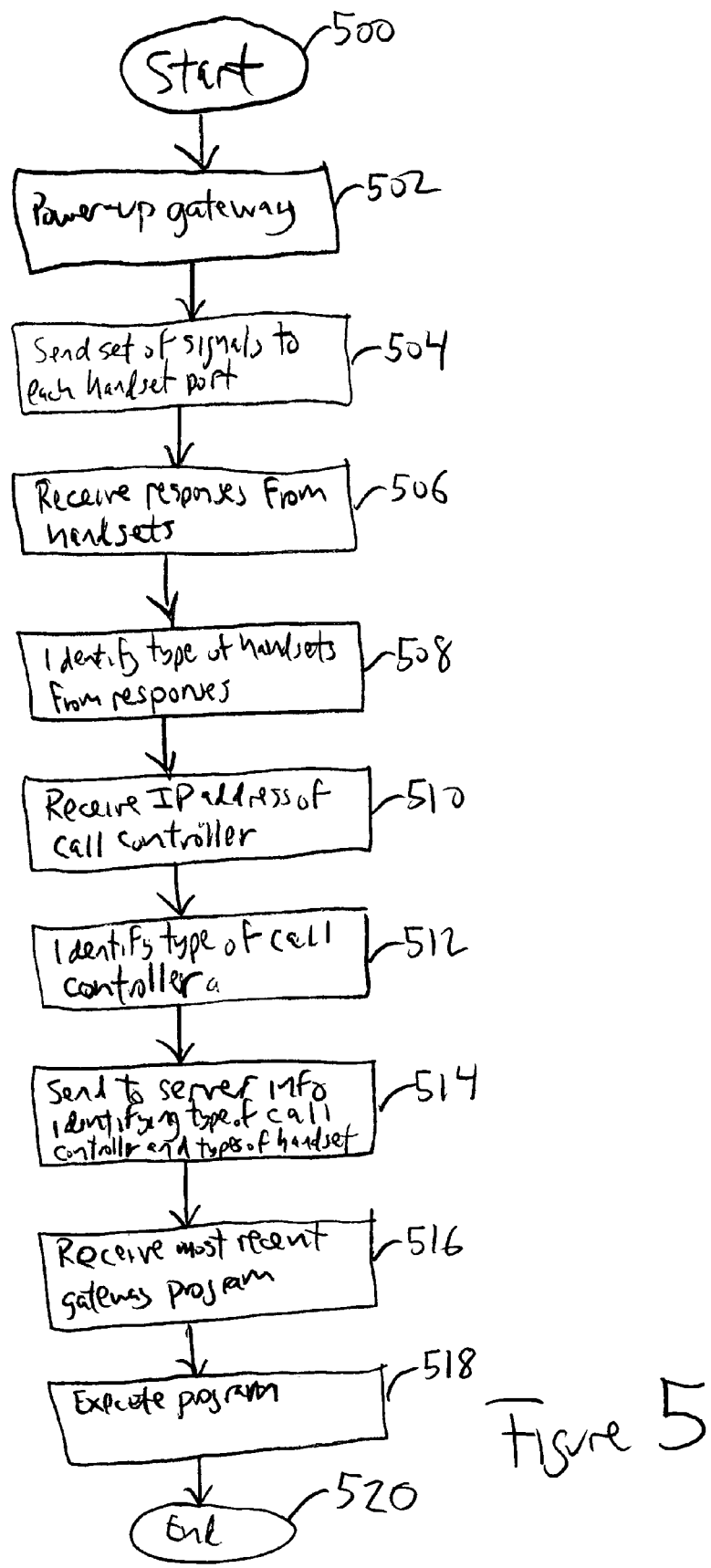
FIG. 5 is a flowchart showing the process executed by the handset gateway of FIGS. 1A-1C and FIG. 2 according to one embodiment of the present invention.

FIG. 1A shows the gateway in a system where the gateway 11 is remote from the IP call controller 12, coupled via an IP network 17, which might be a LAN or WAN or the Internet. The system is coupled to the public switched telephone network (PSTN) 15 via a PSTN gateway 14. IP telephone handsets 16 may be coupled to the network 17 and other network devices, such as new IP telephone handsets 13 or a computer 18 may be coupled to the network 17 via IP sub-ports in the gateway 11.

As shown in FIG. 1B, the gateway 11 might be configured to work with an IP Centrex service call controller 24 across any broadband IP network, including the Internet 23.

As shown in FIG. 1C, the gateway may be implemented as a card 40 which plugs into a slot in a proprietary IP call controller 42. The traditional non-IP digital handsets 10 are connected via wires to the gateway card 40. The IP call controller 42 is connected to an IP network 17 which may be connected to a PSTN gateway 14 for connection to the public switch telephone network 15. The IP connection from the call controller to the PSTN gateway can be internal to the call controller chassis and the PSTN gateway can be a plug-in card.

Refer to FIG. 2, Handset Gateway Internal Design. Each traditional non-IP digital handset 10 is connected to the gateway through a Line Interface 31 which is preferably based on the existing generic digital handset interface developed and marketed by CITEL, assignee of this patent.

A single FPGA (field programmable gate array) device 32 is partitioned into a number of virtual line interface logic units 33, one for each handset, and an aggregating FPGA 34 multiplexes all of the channels together before passing the control and audio information to the central processor 38.

Discrete ROM 36 is used to store the loaded program which is run by the central processor 38. For the preferred embodiment, the ROM is programmable and electronically erasable, such as flash memory, for storing the downloaded program. The gateway is initially shipped with a program in the ROM that, upon power-up, performs the following steps as shown in the flowchart of FIG. 5. First the process starts in step 500 and goes to step 502 in which the handset gateway is powered-up. The process proceeds to step 504 and the handset gateway sends a set of signals to each handset port that is designed to produce a different response from each different proprietary handset that the gateway is intended to work with. Then, the signal that is received in response (step 506) is processed and compared to data stored in the ROM to identify the type of handset on that port, if any, and this information is stored in the ROM as shown in step 508 of FIG. 5. Next, the gateway waits for a hyper text transfer protocol (HTTP) query from a browser directed to the gateway's built-in IP address. Upon receipt of the query, in step 510 the program displays in HTTP the handset information and a field where a user can enter an IP address of the IP call controller that the gateway is to work with. Then, the gateway sends a set of signals to the IP call controller and receives in response a set of signals that identifies the type of call controller, as shown in step 512. Then in step 514 the gateway then sends via IP to a web server operated by the gateway vendor a set of information identifying the type of IP call controller and the type of handset on each port. The server then sends to the gateway in step 516 the latest program designed to cause the gateway to work well (step 518) with the controller and the handsets. The process ends in step 520.

Discrete RAM 37 is required for buffering audio streams during packetization/depacketization by the processor 38.

The central processor 38 performs the messaging translation, channel arbitration, and the interface to an IP call controller 12 via an Ethernet interface 39.

DSP(s) 35 perform the audio compression/expansion (transcoding).

In operation, the Handset Gateway 11 connects to the IP network 17 and performs one IP telephony endpoint registration with the IP call controller per handset device. The gateway can use DHCP (Dynamic Host Configuration Protocol) from a local server to obtain its IP address or addresses (one per attached handset device) or such IP address or addresses can be programmed into the gateway through a configuration interface. To the IP call controller 12, each handset device connection appears as a discrete connection to the IP telephony network; while the gateway is transparent, appearing as a collection of IP telephones. To the digital non-IP handsets 10, the gateway appears as a digital non-IP PBX or KTS. The gateway converts each handset's TDM signaling into packetized IP signaling. By sharing resources such as CPU, RAM, ROM, and DSP, the clustered gateway is much more economical than IP telephones 13, where each phone has its own CPU and related resources.

The Handset Gateway differs from prior technology in a number of ways.
1. Each digital handset appears as an endpoint to the IP Telephony network rather than the Gateway itself appearing as the end point. This is significant as it means that each digital handset is a discrete entity from the IP call controller perspective.
2. The digital handsets are connected to the IP call controller ("PBX") using the Gateway to translate the protocol stream for call control. The protocol is not simply encapsulated and transmitted from one point to another using an IP protocol, rather, the individual messages from the handsets are interpreted by the Gateway and translated to the protocol expected by the IP call controller, and messages from the IP call controller are likewise translated to the protocol for the handset.
3. The handset gateway uses a separate IP telephony session per phone, and a separate address for IP communications per phone.
4. The handset gateway 'pretends' to be a PBX or KTS and responds to the handset upon receipt of protocol messages sent by the digital handset.
5. The handset gateway will act as a router for other IP devices as shown in FIGS. 1A and 1B, giving priority to the connected digital phones.
6. In the prior art, programmable devices for connecting a handset to a PBX can be programmed only to connect to PBX handsets that are intended to work with that PBX. That is, in the prior art, the input protocol from the handset must match the output protocol to the PBX. By contrast, the Handset Gateway is separately programmable on the input and the output so it can match any handset to any IP call controller ("PBX").
7. The Handset Gateway registers itself with the IP PBX for management purposes.

The gateway can be programmed to handle various features and functions of the non-IP digital handsets rather than simply passing all signals from the handsets on to the IP call controller for handling. This is accomplished by changing the programs stored in the ROM. For example, if a signal is received from a handset specifying that a call is to be placed on hold, no signal needs to be sent to the IP call controller. Instead, the gateway can simply drop any voice signal packets that it receives from the IP call controller while the call is on hold and likewise drop any voice signal packets that it receives from the handset while the call is on hold. The gateway can send music or some other on-hold sounds in place of signals from the handset. The gateway can send a signal to the handset to turn on a hold indicator light.

Similarly, if a handset user wishes to add another handset on the gateway to a telephone conversation, no signal needs to be passed to the IP call controller. Instead, the signals can be interpreted by the gateway which can itself ring the second handset telephone. Once the connection is made, the gateway simply passes the voice signals from the IP call controller to both handsets, passes the voice signals from both handsets to the IP call controller, and passes the voice signals from each handset to the other. In this way, many features and functions of an IP call controller can be transferred to the gateway and implemented via programming at the gateway.

While the above description has described particular embodiments of the invention, other embodiments are possible. The invention is to be defined by the following claims without limitation based on the above description.

The invention claimed is:

1. A gateway for using non-IP digital PBX telephone handsets with an IP call controller, comprising:
   (a) one or more handset ports for coupling to one or more non-IP digital PBX telephone handsets;
   (b) an IP port for coupling to an IP network device; and
   (c) a protocol translator circuit that
      (i) translates non-IP digital PBX telephone call control signals received at a handset port directly into IP telephone call control signals for an IP telephone call controller and delivers them to the IP port; and
      (ii) translates IP telephone call control signals received at the IP port from an IP telephone call controller directly into non-IP digital PBX telephone call control signals and delivers them to the one or more handset ports; and
   wherein the gateway is further configured to automatically determine the type of handsets coupled to each handset port by, for each handset port,
   receiving a signal corresponding to a coupled handset;
   transmitting information identifying the handset to a remote IP server via the IP port; and
   receiving, from the server, programming information to cause the gateway to work with the handset.

2. The gateway of claim 1 wherein the protocol translator circuit is programmable such that it can be programmed to operate properly with each of a plurality of protocols for non-IP digital PBX telephone call control signals.

3. The gateway of claim 1 wherein the protocol translator circuit is programmable such that it can be programmed to operate properly with each of a plurality of protocols for IP telephone call controllers.

4. The gateway of claim 2 wherein the protocol translator circuit is programmed by IP download via the IP port.

5. The gateway of claim 3 wherein the protocol translator circuit is programmed by IP download via the IP port.

6. The gateway of claim 4 wherein the download is initiated in response to establishment of an IP session between the gateway and an IP service.

7. The gateway of claim 5 wherein the download is initiated in response to establishment of an IP session between the gateway and an IP service.

8. The gateway of claim 1 wherein, upon receipt at a handset port of one or more predetermined non-IP digital PBX call control signals, instead of or in addition to translating the signal into an IP telephone call control signal, the protocol translator circuit returns a non-IP digital PBX call control signal to the handset port.

9. The gateway of claim 1 wherein the one or more non-IP digital PBX handset ports includes a first handset port and a second handset port wherein, upon receipt at the first handset port of one or more predetermined non-IP digital PBX call control signals, instead of or in addition to translating the signal into an IP telephone call control signal, the protocol translator circuit sends a non-IP digital PBX call control signal to the second handset port.

10. The gateway of claim 9 wherein the call control signals are for establishing a voice conference that includes the first and the second handset ports.

11. The gateway of claim 1 further comprising an address registration circuit that assigns an address for IP communications to each handset port to which a non-IP digital PBX telephone is coupled and registers each address for IP communications with the IP telephone call controller.

12. The gateway of claim 1 further comprising a registration circuit that registers the gateway with the IP telephone call controller for subsequent system management.

13. The gateway of claim 1 further comprising a general purpose IP router coupled to the IP port and to one or more IP sub-ports in the gateway for coupling other IP devices to the IP network, where the router gives voice quality preference to IP packets going to or from the one or more telephone handset ports over IP packets going to or from devices coupled to the one or more IP sub-ports.

14. The gateway of claim 1 having an external form of a plug-in card for an IP telephone call controller where the IP port has an external form for coupling to contacts in said IP telephone call controller.

15. The gateway of claim 1, wherein the one or more handset ports, IP port, and protocol translator circuit are disposed in a single housing.

16. The gateway of claim 1 wherein the one or more handset ports, IP port, and protocol translator circuit are configured to communicate through a fully digital signal path.

17. The gateway of claim 1, wherein the gateway is further configured to automatically determine the type of handsets coupled to each handset port by:
   sending to each handset port a set of signals designed to produce a different response from each different proprietary handset that the gateway is intended to work with; and
   processing the response that is received from each handset port to compare to data stored in memory to identify the type of handset on the handset port.

18. A system wherein non-IP digital PBX telephone handsets are coupled to an IP telephone call controller in a public telephone network, comprising:
   (a) an IP telephone call controller operating a public telephone network according to public IP call control protocols and coupled to the global IP network;
   (b) a gateway coupled to the global IP network at a location remote from the IP telephone call controller;
   (c) one or more non-IP digital PBX telephone handsets coupled to the gateway via wires for carrying non-IP digital PBX telephone call control signaling between the handset and the gateway;
   (d) the gateway having one or more all-digital protocol translating circuits that:
      (i) send a set of signals to each non-IP digital PBX telephone handset designed to produce a different response from each of a plurality of different proprietary handsets;
      (ii) process the response or responses that are received to identify the type of each non-IP digital PBX telephone handset;
      (iii) transmit information identifying each handset to a remote IP server;
      (iv) receive from the remote IP server programming information to cause the gateway to work with each handset;
      (v) translate non-IP digital PBX call control signals received from the handset into IP call control signals according to the public IP call control protocols of the call controller; and
      (vi) translate IP call control signals from the call controller into non-IP digital PBX call control signals for a handset coupled to the gateway.

19. The system of claim 18 wherein the gateway further comprises a general purpose IP router coupled to the IP port and to one or more IP sub-ports in the gateway for coupling other IP devices to the global IP network, where the router gives voice quality preference to IP packets going to or from the one or more telephone handsets over IP packets going to or from devices coupled to the IP sub-ports.

20. A system wherein non-IP digital PBX telephone handsets are coupled to a proprietary IP telephone call controller in a private telephone network, comprising:
(a) a proprietary IP telephone call controller operating according to proprietary IP call control protocols and coupled to the global IP network;
(b) a gateway coupled to the global IP network at a location remote from the call controller;
(c) one or more non-IP digital PBX telephone handsets coupled to the gateway via wires for carrying non-IP digital PBX telephone call control signaling between the handset and the gateway;
(d) the gateway having one or more protocol translating circuits that:
(i) send a set of signals to each non-IP digital PBX telephone handset designed to produce a different response from each of a plurality of different proprietary handsets;
(ii) process the response or responses that are received to identify the type of each non-IP digital PBX telephone handset;
(iii) transmit information identifying the type of each handset to a remote IP server;
(iv) receive from the server programming information to cause the one or more protocol translating circuits to work with the handset;
(v) directly translate non-IP digital call control signals received from the handset into IP call control signals according to proprietary IP call control protocols of the call controller; and
(vi) directly translate proprietary IP call control signals from the call controller into non-IP digital call control signals for a handset coupled to the gateway.

21. The system of claim 20 wherein the gateway further comprises a general purpose IP router coupled to the IP port and to one or more IP sub-ports in the gateway for coupling other IP devices to the global IP network, where the router gives voice quality preference to IP packets going to or from the one or more telephone handsets over IP packets going to or from devices coupled to the IP sub-ports.

22. A system wherein non-IP digital PBX telephone handsets are coupled to a gateway in the form of a plug-in card in a proprietary IP telephone call controller in a private telephone network, comprising:
(a) a proprietary IP telephone call controller operating according to proprietary IP call control protocols and coupled to the global IP network;
(b) a gateway card plugged into the call controller; and
(c) one or more non-IP digital PBX telephone handsets coupled to the gateway card via wires for carrying non-IP digital PBX telephone call control signaling between the handset and the gateway card;
(d) the gateway card having one or more protocol translating circuits that:
(i) send a set of signals to each non-IP digital PBX telephone handset designed to produce a different response from each of a plurality of different proprietary handsets;
(ii) process the response or responses that are received to identify the type of each non-IP digital PBX telephone handset;
(iii) transmit information identifying the type of each handset to a remote IP server;
(iv) receive from the remote IP server programming information to cause the one or more protocol translating circuits to work with the handset;
(v) translate non-IP digital call control signals received from the handset directly into IP call control signals according to proprietary IP call control protocols of the call controller; and
(vi) translate proprietary IP call control signals from the call controller directly into non-IP digital call control signals for a handset coupled to the gateway.

23. A method for translating call control signals between an IP network and non-IP digital PBX telephone handsets comprising:
sending to a handset port a set of signals designed to produce a different response from different non-IP digital handsets;
receiving a response from the handset port a response indicative of the type of non-IP digital handset coupled to the handset port;
transmitting the actual signals received from the handset port to a remote IP server via an IP port;
receiving programming information from the remote IP server for translating signals from the non-IP digital handset coupled to the handset port;
receiving a first non-IP digital PBX telephone call control signal at the handset port;
translating the first non-IP digital PBX telephone call control signal directly into a first IP telephone call control signal;
delivering the first IP telephone call control signal to an IP port;
receiving a second IP telephone call control signal at the IP port;
translating the second IP telephone call control signal directly into a second non-IP digital PBX telephone call control signal; and
delivering the second non-IP digital PBX telephone call control signal to the handset port.

24. The method for translating call control signals between an IP network and non-IP digital PBX handsets of claim 23 wherein translating telephone call control signals occurs in a protocol translator circuit; and further comprising:
programming the protocol translator circuit to translate telephone call control signals from and to a plurality of protocols for non-IP digital PBX telephone handsets.

25. The method for translating call control signals between an IP network and non-IP digital PBX handsets of claim 23 wherein translating telephone call control signals occurs in a protocol translator circuit; and further comprising:
programming the protocol translator circuit to translate telephone call control signals from and to a plurality of protocols for IP telephone call controllers.

26. The method for translating call control signals between an IP network and non-IP digital PBX handsets of claim 23 wherein translating telephone call control signals occurs in a protocol translator circuit; and further comprising:
programming the protocol translator circuit by IP download via the IP port.

27. The method for translating call control signals between an IP network and non-IP digital PBX handsets of claim 26 further comprising:
establishing an IP session between a gateway and an IP service; and
initiating the download in response to establishing the IP session.

28. The method for translating call control signals between an IP network and non-IP digital PBX handsets of claim 23 further comprising:
receiving at the handset port a third non-IP digital PBX call control signal; and returning a fourth non-IP digital PBX call control signal to the handset port without delivering a corresponding IP telephone call control signal to the IP port.

29. The method for translating call control signals between an IP network and non-IP digital PBX handsets of claim 23 further comprising:
   receiving at a first handset port a fifth non-IP digital PBX call control signal; and
   sending a sixth non-IP digital PBX call control signal to a second handset port.

30. The method for translating call control signals between an IP network and non-IP digital PBX handsets of claim 23 further comprising:
   assigning an address for IP communications to each handset port to which a non-IP digital PBX telephone is coupled; and
   registering each address for IP communications with the IP telephone call controller.

31. The method for translating call control signals between an IP network and non-IP digital PBX handsets of claim 23 further comprising:
   routing non-voice IP data packets between the IP port and one or more IP sub-ports;
   while providing quality-of-service preference to voice IP data packets translated to and from handset ports coupled to non-IP digital PBX telephone handsets.

32. The method for translating call control signals between an IP network and non-IP digital PBX handsets of claim 23 wherein delivering the first IP telephone call control signal to the IP port and receiving the second IP telephone call control signal from the IP port further comprises respectively transmitting and receiving corresponding electrical signals via plug-in contacts to and from a coupled IP telephone call controller.

* * * * *